United States Patent
Pohlabel et al.

(10) Patent No.: US 7,463,593 B2
(45) Date of Patent: Dec. 9, 2008

(54) NETWORK HOST ISOLATION TOOL

(75) Inventors: Christian A. Pohlabel, Hillsborough, NC (US); James M. Polard, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/034,901

(22) Filed: Jan. 13, 2005

(65) Prior Publication Data

US 2006/0153192 A1    Jul. 13, 2006

(51) Int. Cl.
*H04J 1/16* (2006.01)
*H04L 12/56* (2006.01)

(52) U.S. Cl. .................. 370/252; 370/230; 370/400; 709/238

(58) Field of Classification Search .............. 370/389, 370/337, 338, 400, 401, 352–356, 252, 230; 709/238–242, 220–226; 713/201; 726/3
See application file for complete search history.

(56) References Cited

U.S. PATENT DOCUMENTS

| | | | |
|---|---|---|---|
| 6,167,052 A | 12/2000 | McNeill et al. | 370/399 |
| 6,195,356 B1 | 2/2001 | Anello et al. | 370/398 |
| 6,453,411 B1 | 9/2002 | Hsu et al. | 712/237 |
| 6,538,997 B1 | 3/2003 | Wang et al. | 370/241 |
| 6,665,715 B1 | 12/2003 | Houri | 709/223 |
| 6,754,622 B1 | 6/2004 | Beser et al. | 704/226 |
| 7,200,865 B1 * | 4/2007 | Roscoe et al. | 726/12 |
| 2003/0037163 A1 | 2/2003 | Kitada et al. | 702/236 |
| 2003/0145090 A1 | 7/2003 | Ostergaard | 709/229 |
| 2003/0153328 A1 | 8/2003 | Booth et al. | 455/456.1 |
| 2004/0081083 A1 | 4/2004 | Sekihata | 370/222 |
| 2004/0087304 A1 * | 5/2004 | Buddhikot et al. | 455/426.2 |
| 2004/0093521 A1 * | 5/2004 | Hamadeh et al. | 713/201 |
| 2008/0005782 A1 * | 1/2008 | Aziz | 726/3 |

* cited by examiner

*Primary Examiner*—John Pezzlo
(74) *Attorney, Agent, or Firm*—David Irvin; Hoffman Warnick LLC

(57) ABSTRACT

The present invention provides a method, system, and computer program product for quickly and automatically blocking a plurality of computer systems in response to detection of a widespread vulnerability or software infection. The method comprises: providing a list of Internet Protocol (IP) addresses corresponding to a plurality of devices to be blocked in a network; and for each IP address in the list: determining a router in the network connected to the IP address; determining a layer-2 Media Access Control (MAC) address associated with the IP address; and applying a CAM filter to a core switch associated with the router to block communication from the device corresponding to the IP address, at the core switch; wherein the blocking of the plurality of devices occurs automatically in response to the provision of the list of IP addresses.

22 Claims, 6 Drawing Sheets

NETWORK HOST ISOLATION TOOL

BACKGROUND OF THE INVENTION

1. Field of the Invention

The present invention generally relates to computer systems. More particularly, the present invention provides a method, system, and computer program product for quickly and automatically blocking a plurality of computer systems in response to detection of a widespread vulnerability or software infection.

2. Related Art

When one or more computer systems on a network are detected to have a vulnerability (e.g., lack of a required patch) or an active software infection (e.g., virus, worm, etc.), they must be isolated from the network to prevent further spread of infections. To isolate the computer systems, a common process is to manually block each computer system at its layer-2 (Media Access Control (MAC)) address, on a core switch in the network. After being blocked, data related to the computer systems is collected and stored in a database for later use in determining the problem, as well as for administrative use for unblocking the computer systems after the problem has been addressed. This is a very time-consuming process when performed manually, often taking several minutes per computer system. Unfortunately, in larger networks containing, for example, hundreds of computer systems, a software infection may spread at a rate faster than the computer systems can be manually shut down. Other solutions exist which perform blocking on a layer-3 Internet Protocol (IP) address level, but none of these solutions operate on a layer-2 MAC address.

SUMMARY OF THE INVENTION

In general, the present invention provides a method, system, and computer program product for quickly and automatically blocking a plurality of computer systems in response to detection of a widespread vulnerability or software infection. In particular, in accordance with the present invention, there is provided an automated process for blocking a plurality of computer systems at a layer-2 MAC level using only a list of the IP addresses of the computer systems provided by a user. After receiving the list of IP addresses, the layer-2 MAC address for each IP address is obtained by querying the core routers of the network. For each obtained MAC address, a CAM filter is placed in the core switch that is directly connected to the branch of the network on which the MAC address is located. The CAM filter blocks network traffic sourced from the computer system located at that MAC address, at the core switch. The MAC address is then traced from the core switch through the distribution and access switches, until the exact port to which the computer system is connected is located. The blocking and trace results are provided to the user and are entered into a database for later use.

A first aspect of the present invention is directed to an automated method for blocking a plurality of devices in a network, comprising: detecting a software infection or vulnerability in one of the plurality of devices in the network; determining a plurality of devices in the network that need to be blocked to prevent a spread of the software infection or vulnerability from the one device to other devices in the network; providing a list of Internet Protocol (IP) addresses corresponding to the plurality of devices to be blocked in the network; and for each IP address in the list: determining a router in the network connected to the P address: determining a layer-2Media Access Control (MAC) address associated with the IP address; and applying a CAM filter to a core switch associated with the router to block communication from the device corresponding to the IP address, at the core switch; wherein the blocking of the plurality of devices occurs automatically in response to the provision of the list of IP addresses.

A second aspect of the present invention is directed to a system for automatically blocking a plurality of devices in a network, comprising: a system for detecting a software infection or vulnerability in one of the plurality of devices in the network; a system for determining a plurality of devices in the network that need to be blocked to prevent a spread of the software infection or vulnerability from the one device to other devices in the network; a system for providing a list of Internet Protocol (IP) addresses corresponding to the plurality of devices to be blocked in the network; and a system for automatically blocking the plurality of devices in response to the provision of the list of IP addresses, wherein, for each IP address in the list, the system for automatically blocking is configured to: determine a router in the network connected to the IP address: determine a layer-2 Media Access Control (MAC) address associated with the IP address; and apply a CAM filter to a core switch associated with the router to block communication from the device corresponding to the IP address, at the core switch.

A third aspect of the present invention is directed to a program product stored on a recordable medium, which when executed, automatically blocks a plurality of devices in a network, the computer readable medium comprising program code for causing a computer system to: detect a software infection or vulnerability in one of the plurality of devices in the network; determine a plurality of devices in the network that need to be blocked to prevent a spread of the software infection or vulnerability from the one device to other devices in the network: provide a list of Internet Protocol (IP) addresses corresponding to the plurality of devices to be blocked in the network: and automatically block the plurality of devices in response to the provision of the list of IP addresses, wherein, for each IP address in the list, the blocking is configured to: determine a router in the network connected to the IP address: determine a layer-2Media Access Control (MAC) address associated with the IP address: and apply a CAM filter to a core switch associated with the router to block communication from the device corresponding to the IP address, at the core switch.

A fourth aspect of the present invention is directed to a method for deploying an application for automatically blocking a plurality of devices in a network, comprising: providing a computer infrastructure being operable to: detect a software infection or vulnerability in one of the plurality of devices in the network; determine a plurality of devices in the network that need to be blocked to prevent a spread of the software infection or vulnerability from the one device to other devices in the network: provide a list of Internet Protocol (IP) addresses corresponding to the plurality of devices to be blocked in the network; and for each IP address in the list: determine a router in the network connected to the IP address; determine a layer-2 Media Access Control (MAC) address associated with the IP address; and apply a CAM filter to a core switch associated with the router to block communication from the device corresponding to the IP address, at the core switch; wherein the blocking of the plurality of devices occurs automatically in response to the provision of the list of IP addresses.

BRIEF DESCRIPTION OF THE DRAWINGS

These and other features of this invention will be more readily understood from the following detailed description of the various aspects of the invention taken in conjunction with the accompanying drawings in which.

Figure 1:
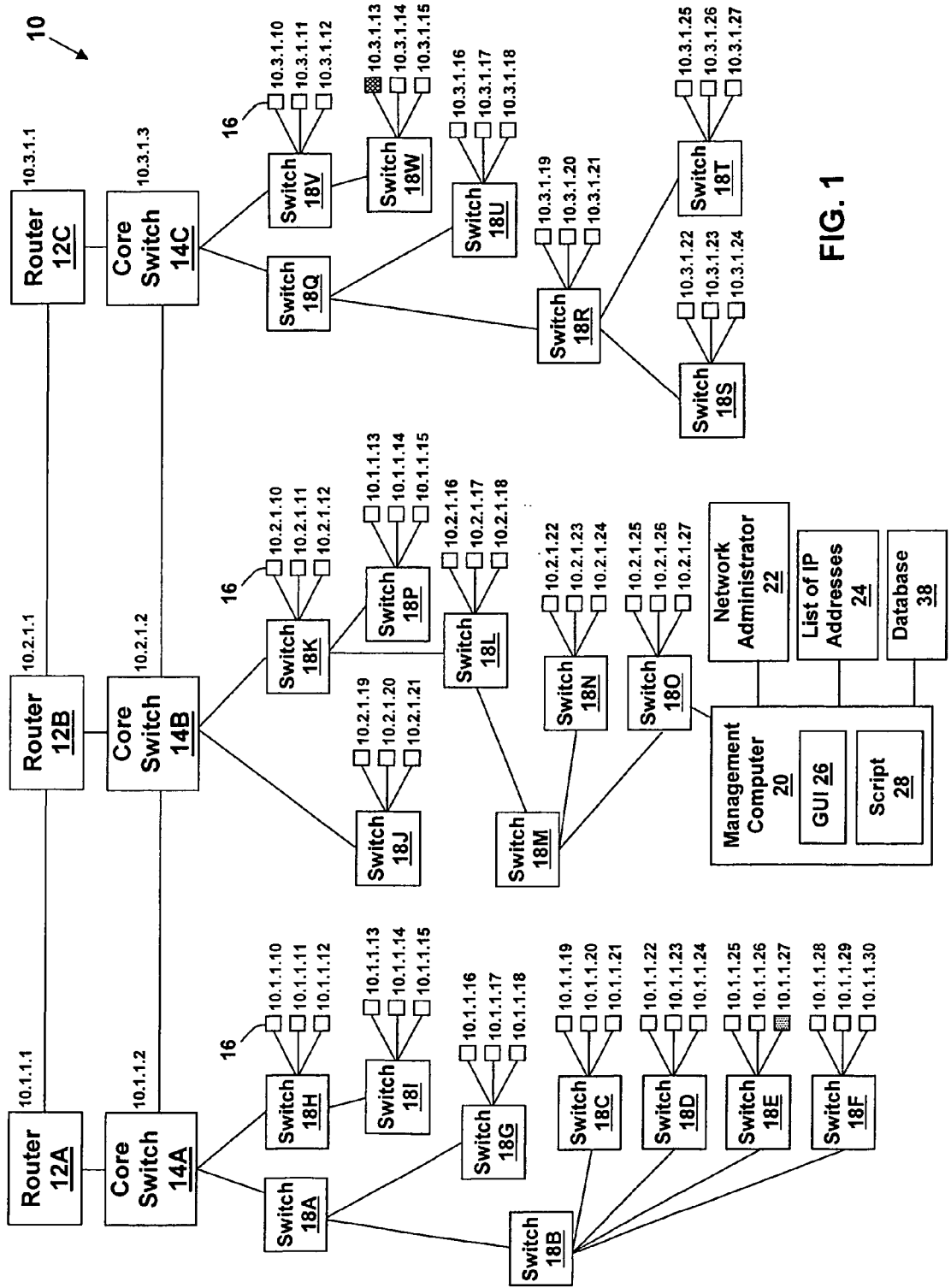
FIG. 1 depicts an illustrative network in which the present invention can be practiced.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for quickly blocking a plurality of computer systems in response to detection of a widespread vulnerability or software infection. In particular, in accordance with the present invention, there is provided an automated process for blocking a plurality of computer systems at a layer-2 MAC level using only a list of the IP addresses of the computer systems provided by a user. After receiving the list of IP addresses, the layer-2 MAC address for each IP address is obtained by querying the core routers of the network. For each obtained MAC address, a CAM filter is placed in the core switch that is directly connected to the branch of the network on which the MAC address is located. The CAM filter blocks network traffic sourced from the computer system located at that MAC address, at the core switch. The MAC address is then traced from the core switch through the distribution and access switches, until the exact port to which the computer system is connected is located. The blocking and trace results are provided to the user and are entered into a database for later use.

An illustrative network 10 in which the present invention can be practiced is shown in FIG. 1. Network 10 comprises a plurality of routers 12 (12A, 12B, 12C) and a plurality of core switches 14 (14A, 14B, 14C). Routers 12 can be connected to the Internet or other network(s). A plurality of devices 16 (e.g., computers) are connected to each of the core switches 14, via a chain of distribution and access switches 18 (18A, 18B, . . . , 18W). Each router 12, core switch 14, device 16, and switch 18 is identified by an IP address (e.g., 10.1.1.1) in network 10. A management computer 20, operated by a network administrator 22 or the like, is connected to network 10 in some manner (e.g., through switch 18O) and has access to each of the routers 12, core switches 14, devices 16, and switches 18. It is assumed that the configuration/operation of such a network is within the purview of one skilled in the art. Accordingly, further detail regarding the configuration/operation of network 10 is not provided herein. It should noted that network 10 is presented for descriptive purposes only, and is not intended to be limiting in any way.

As indicated by the shaded boxes in FIG. 1, the devices 16 located at IP addresses 10.1.1.27 and 10.3.1.13 need to be blocked for some reason (e.g., in response to a worm infection or an unpatched vulnerability). The manner in which these devices 16 are blocked in accordance with an embodiment of the present invention is detailed in the flow diagram 30 of FIG. 2, which will be described below in connection with the components of network 10.

Figure 2:
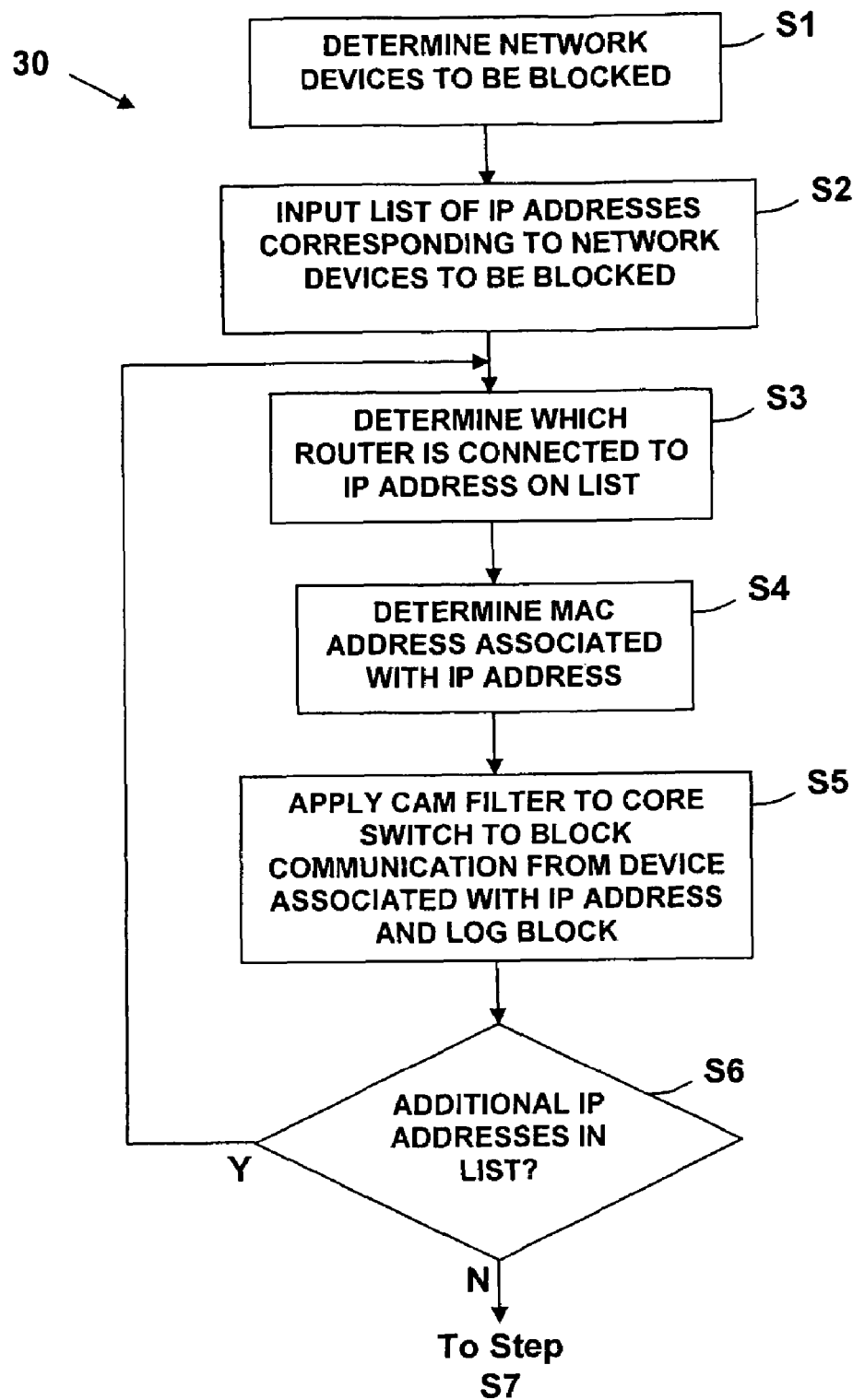
FIG. 2 depicts a flow diagram of a method in accordance with an embodiment of the present invention.

In step S1 of FIG. 2, the network administrator 22 (or other authorized user) determines that one or more devices 16 on the network 10 need to be blocked. This determination can be made using any now known or later developed technique. In step S2, the network administrator 22 inputs a list 24 of the IP addresses of the devices 16 that need to be blocked into the management computer 22 using an input graphical user interface (GUI) 26 (e.g., a web page), and provides comments and/or other information detailing why the identified devices 16 need to be blocked. The list 24 of IP addresses can be gathered using any now known or later developed technique.

In step S3 of FIG. 2, for an IP address on the list 24, a script 28 (which may comprise one or more different scripts) running on the management computer 22 queries (e.g., via telnet protocol) the routers 12 to determine which router 12 is connected to the IP address. This is done by determining which router 12 contains an address resolution protocol (ARP) entry for the IP address (only the router 12 directly connected to the branch of the network 10 containing the device 16 with the IP address contains the ARP entry). In step S4, the script 28 queries the router 12 connected to the IP address for the layer-2 media access control (MAC) address associated with the IP address. In step S5, the script 28 applies a CAM filter for the MAC address to the core switch 14 to block all communication from the device 16 associated with the IP address at the core switch 14, and logs the block in a database 38 for future use. Steps S3-S5 are repeated (step S6) for each IP address on the list 24 of IP addresses. The above-described blocking process occurs automatically in response to the input of the list 24 of IP addresses. A CAM filter is a tool provided with Cisco Catalyst operating systems (CatOS). It is applied by connecting to the desired core switch 14 and entering a command such as:

set cam permanent filter <MAC address><VLAN>
e.g., set cam permanent filter 00-0d-60-49-7f-91 168.

Figure 3:
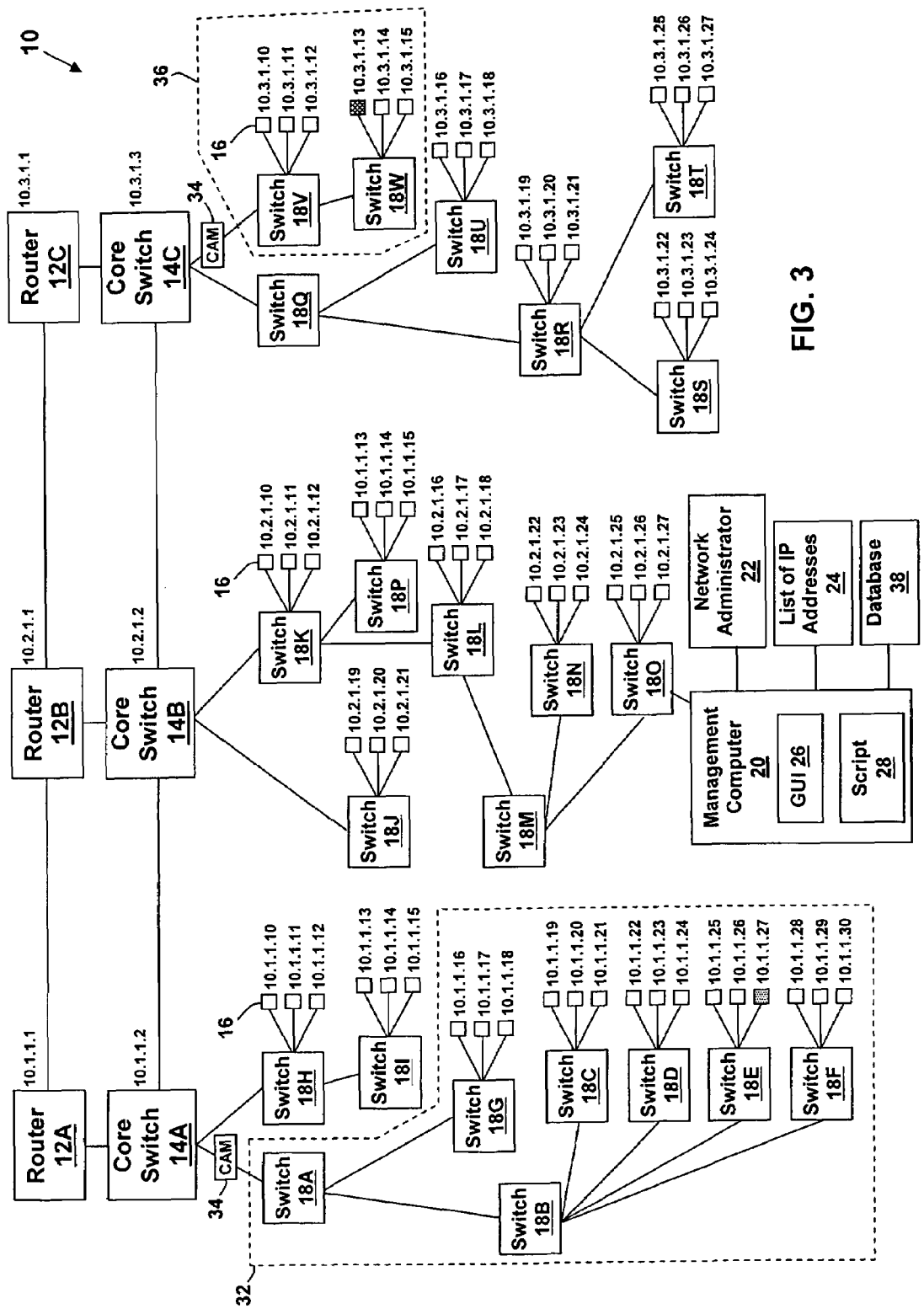
FIG. 3 depicts the network of FIG. 1 with two branches of the network isolated by CAM filters in accordance with an embodiment of the present invention.

Assuming that the list 24 of IP addresses includes the IP addresses 10.1.1.27 and 10.3.1.13, the network 10 would now appear as illustrated in FIG. 3. As shown, the device 16 on branch 32 of network 10 having the IP address of 10.1.1.27 is isolated from all devices 16 of the network 10 outside of branch 32 by the CAM filter 34 applied to core switch 14A. This device 16, however, is still able to communicate with all other devices 16 on branch 32 of network 10. The other devices 16 on branch 32 of network 10 can communicate freely with any other non-isolated device 16 on the network 10. Similarly, the device 16 on branch 36 of network 10 having the IP address of 10.3.1.13 is isolated from all devices 16 of the network 10 outside of branch 36 by the CAM filter 34 applied to core switch 14C. This device 16, however, is still able to communicate with all other devices 16 on branch 36 of network 10. The other devices 16 on branch 36 of network 10 can communicate freely with any other non-isolated device 16 on the network 10. The portions of the network 10 not affected by the CAM filters 34 operate in a normal manner.

The present invention traces each MAC address determined in step S4 of FIG. 2 from the core switch 14 through the distribution and access switches 18, until the exact port to which each corresponding device 16 is connected is identified. A flow diagram 40 depicting a method for tracing MAC addresses as described above in accordance with an embodiment of the present invention is illustrated in FIG. 4.

In step S7, for a MAC address determined in step S4 of FIG. 2, the script 28 determines the port on a corresponding core switch 14 on which the MAC address in question was seen. In step S8, the script 28 determines whether the port identified in step S7 is connected to another switch 18 or to the device 16 having the IP address associated with the MAC address. This can be done for example, using a Cisco Discovery Protocol (CDP) neighbor operation (CDP is a proprietary Cisco protocol for discovering devices on a network). In step S9, if the port is connected to another switch 18, the script 28 connects to that switch 18, and determines the port on that switch 18 on which the MAC address in question was seen. Flow then returns to step S8. If, in step S8, the port identified in step S7 is connected to the device 16 having the IP address associated with the MAC address, then the identity of the switch 18 and the port are logged to database 38 in step S10 for future use. The above process is repeated (step S11) for each additional MAC address determined in step S4 of FIG. 2. It should be noted that the tracing operation does not have to be performed after the CAM blocking operation as described above; it can also be performed before and/or during the CAM blocking operation.

Figure 4:
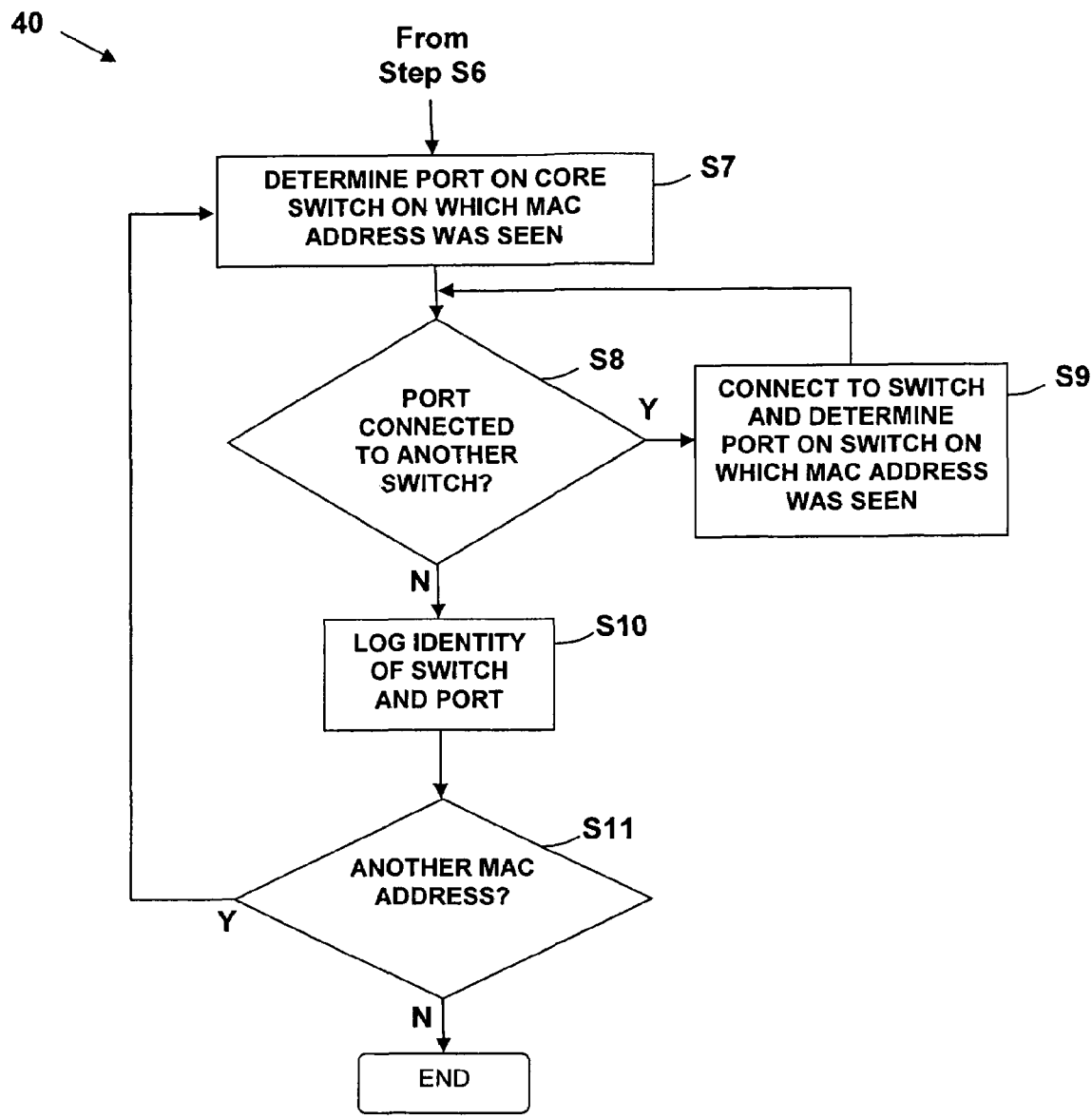
FIG. 4 depicts a flow diagram of a method for tracing MAC addresses in accordance with an embodiment of the present invention.
Figure 5:
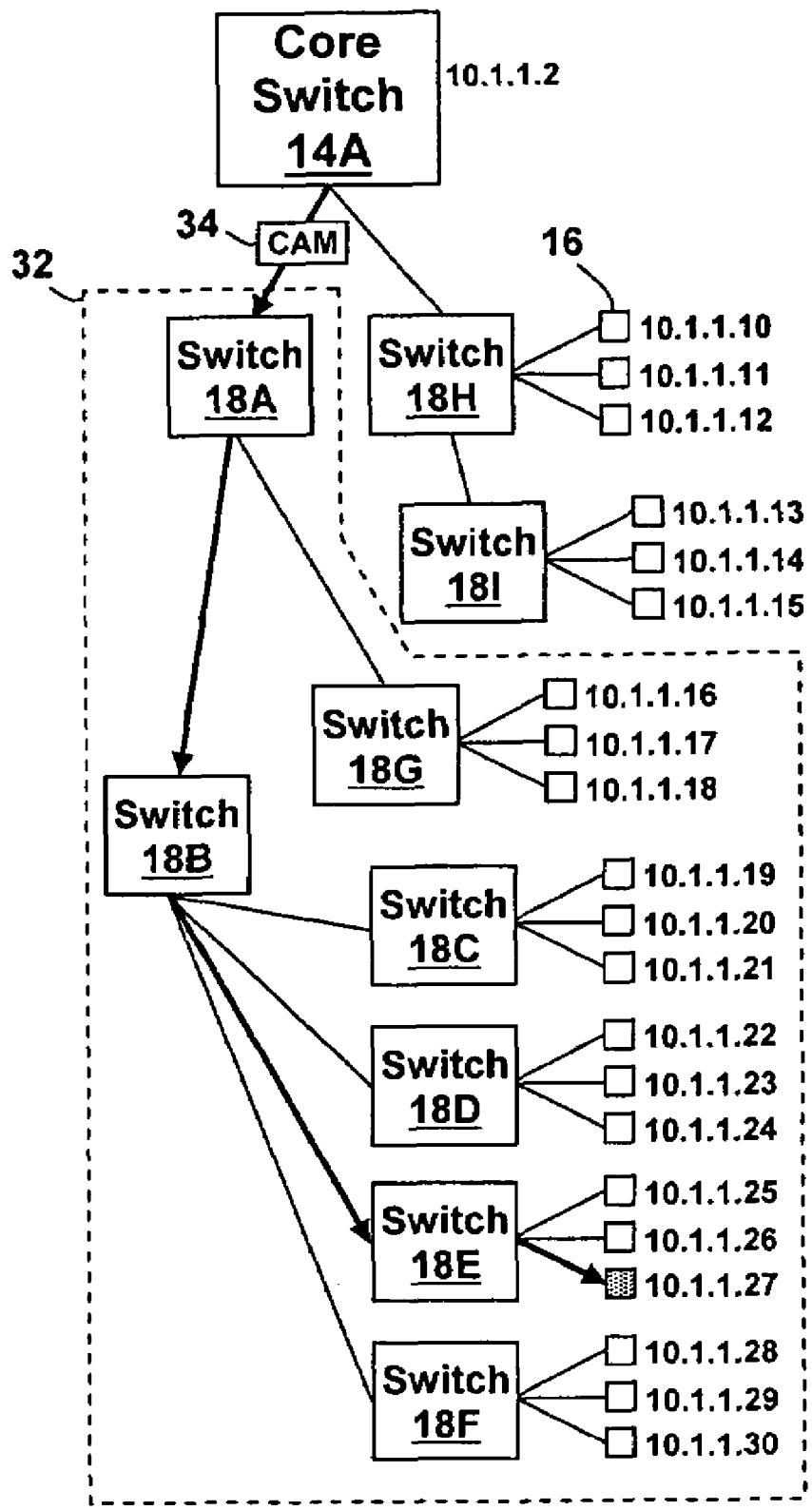
FIG. 5 depicts an example of MAC address tracing in the network of FIG. 1 in accordance with an embodiment of the present invention.

When the process depicted in FIG. 4 is applied to the MAC address associated with the IP address 10.1.1.27 in network 10, the MAC address is traced as shown in FIG. 5. First, the script 28 determines the port on core switch 14A on which the MAC address in question was seen. This port is connected to switch 18A. Next, the script 28 determines that the port on switch 18A on which the MAC address was seen is connected to switch 18B. Next, the script 28 determines that the port on switch 18B on which the MAC address was seen is connected to switch 18E. Finally, the script 28 determines that the port on switch 18E on which the MAC address was seen is not connected to another switch 18, but is connected to the device 16 having the IP address associated with the MAC address.

The present invention automates the process of blocking a plurality of devices (e.g., computer systems) in a network in response to detection of a widespread vulnerability or software infection. This enables blocking to be performed quickly on a large number of devices, using only a list of their IP addresses. For example, using the present invention, it is now possible to block hundreds of devices in the time it took to manually block a single device using prior art methods. As such, the present invention provides for the rapid mass blocking of selected devices in response to detection of a widespread vulnerability or infection, thereby preventing such problems from spreading or otherwise adversely affecting the network. The present invention also traces each IP address in the list down to the last switch and port to which a device having the IP address is connected. The present invention automatically enters the blocking/tracing results in a database (e.g., a Lotus Notes database), allowing easy management of the devices and the blocking process. This data can be used to determine if, when, and why (e.g., based on the comments entered when providing the list of IP addresses) selected devices have been blocked from the network, and the success/failure of the blocking process for each IP address. A message can be sent (e.g., via email) to the network administrator who input the list IP addresses of the devices to be blocked informing the network administrator of the results (e.g., success/failure) of the blocking process for each device. A message can also be sent (e.g., via email) to a user of a device that has been blocked informing the user of the status (e.g., infected, vulnerable, blocked, etc.) of the device, the reason(s) why the device was blocked, the step(s) required to be taken before the device can be unblocked, etc. Many other uses of the data are also possible.

Figure 6:
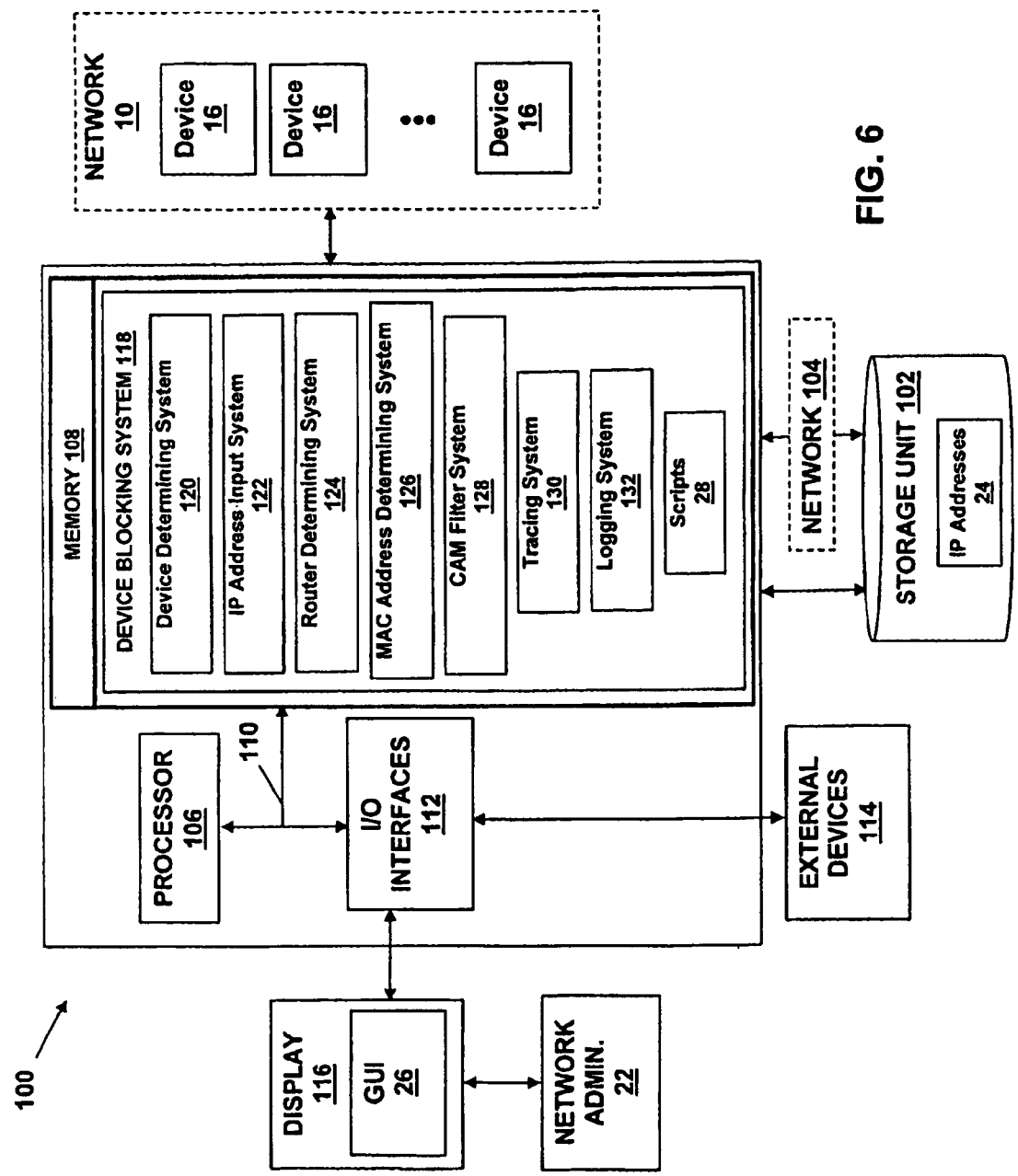
FIG. 6 depicts a computer system for implementing the present invention.

Referring now to FIG. 6, there is illustrated a computer system 100 for blocking a plurality of devices 16 in a network 10 in accordance with the present invention. For clarity, the routers 12 and switches 14, 18 in network 10 are not shown in FIG. 6. Computer system 100 is intended to represent any type of computerized system capable of implementing the methods of the present invention. For example, computer system 100 may comprise a desktop computer, laptop, workstation, server, PDA, cellular phone, pager, etc.

Data used in the practice of the present invention (e.g., the list 24 of IP addresses, tracing information, comments regarding device blocking, logged data, etc.) can be stored locally to computer system 100, for example, in storage unit 102, and/or may be provided to computer system 100 over a network 104. Storage unit 102 can be any system capable of providing storage for data and information under the present invention. As such, storage unit 102 may reside at a single physical location, comprising one or more types of data storage, or may be distributed across a plurality of physical systems in various forms. In another embodiment, storage unit 102 may be distributed across, for example, a local area network (LAN), wide area network (WAN) or a storage area network (SAN) (not shown).

Network 104 is intended to represent any type of network over which data can be transmitted. For example, network 104 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown in FIG. 6, computer system 100 generally includes a processor 106, memory 108, bus 110, input/output (I/O) interfaces 112 and external devices/resources 114. Processor 106 may comprise a single processing unit, or may be distributed across one or more processing units in one or more locations, e.g., on a client and server. Memory 108 may comprise any known type of data storage and/or transmission media, including magnetic media, optical media, random access memory (RAM), read-only memory (ROM), etc. Moreover, similar to processor 106, memory 108 may reside at a single physical location, comprising one or more types of data storage, or be distributed across a plurality of physical systems in various forms.

I/O interfaces 112 may comprise any system for exchanging information to/from an external source. External devices/resources 114 may comprise any known type of external device, including speakers, a CRT, LED screen, handheld device, keyboard, mouse, voice recognition system, speech output system, printer, monitor/display (e.g., display 116), facsimile, pager, etc.

Bus 110 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Shown in memory 108 is a device blocking system 118 in accordance with an embodiment of the present invention. Device blocking system 118 is configured to block a plurality of selected devices 16 in network 10 based on a list 24 of IP addresses input by a network administrator 22 (or other authorized user). The list 24 of IP addresses can be provided by the network administrator 22 via a GUI 26 on display 116, and can be stored in storage unit 102. Also shown in memory 108 are one or more scripts 28 for implementing the present invention. The scripts 28 may comprise, for example, a combination of Perl, shell, and Common Gateway Interface (CGI) scripts.

The device blocking system 118 in memory 108 also includes a device determining system 120 for determining which devices 16 in network 10 need to be blocked, and an IP address input system 122 for inputting a list 24 of IP addresses corresponding to the devices 16 to be blocked. Also provided are a router determining system 124 for determining the router 12 (FIG. 3) to which each device 16 to be blocked is connected, a MAC address determining system 126 for determining the layer-2 MAC address associated with each device 16 to be blocked, and a CAM filter system 128 for applying a CAM filter 134 (FIG. 3) to the appropriate core switch 14 (FIG. 3) to block communication from each device to be blocked, at the core switch 14. A tracing system 130 is provided to the trace the MAC address for each blocked device 16 to the exact port to which the corresponding device 16 is connected is located. A logging system 132 is provided to log the blocking and trace results (e.g., into a database) for later use.

It should be appreciated that the teachings of the present invention can be offered as a business method on a subscription or fee basis. For example, computer system 100 could be created, maintained, supported, and/or deployed by a service provider that offers the functions described herein for customers. That is, a service provider could be used to block a plurality of computer systems in response to detection of a widespread vulnerability or software infection, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. For example, after the switch/port corresponding to an IP address has been traced, that port can be shut off to prevent further spread of an infection from the corresponding device. Such modifications and variations that may be apparent to a person skilled in the art are intended to be included within the scope of this invention as defined by the accompanying claims.

We claim:

1. An automated method for blocking a plurality of devices in a network, comprising:
   detecting a software infection or vulnerability in one of the plurality of devices in the network;
   determining a plurality of devices in the network that need to be blocked to prevent a spread of the software infection or vulnerability from the one device to other devices in the network;
   providing a list of Internet Protocol (IP) addresses corresponding to the plurality of devices to be blocked in the network; and
   for each IP address in the list:
      determining a router in the network connected to the IP address;
      determining a layer-2 Media Access Control (MAC) address associated with the IP address; and
      applying a CAM filter to a core switch associated with the router to block communication from the device corresponding to the IP address, at the core switch;
   wherein the blocking of the plurality of devices occurs automatically in response to the provision of the list of IP addresses.

2. The automated method of claim 1, further comprising:
   for each IP address in the list:
      tracing the MAC address associated with the IP address through the network to determine a switch and port to which the device corresponding to the IP address is connected.

3. The automated method of claim 2, further comprising:
   logging an identity of the switch and port to which the device corresponding to the IP address is connected.

4. The automated method of claim 1, wherein the list of IP addresses is input by a user, further comprising:
   sending results of the blocking to the user who input the list of IP addresses.

5. The automated method of claim 1, wherein the CAM filter isolates a device on a branch of the network from all devices on other branches of the network.

6. The automated method of claim 5, wherein all devices on the branch of the network containing the isolated device can communicate with each other.

7. The automated method of claim 5, wherein any non-isolated device on the branch of the network containing the isolated device can communicate with any other non-isolated device on the network.

8. A system for automatically blocking a plurality of devices in a network, comprising:
   a system for detecting a software infection or vulnerability in one of the plurality of devices in the network;
   a system for determining a plurality of devices in the network that need to be blocked to prevent a spread of the software infection or vulnerability from the one device to other devices in the network;
   a system for providing a list of Internet Protocol (IP) addresses corresponding to the plurality of devices to be blocked in the network; and a system for automatically blocking the plurality of devices in response to the provision of the list of IP addresses, wherein, for each IP address in the list, the system for automatically blocking is configured to:
  determine a router in the network connected to the IP address;
  determine a layer-2 Media Access Control (MAC) address associated with the IP address; and
  apply a CAM filter to a core switch associated with the router to block communication from the device corresponding to the IP address, at the core switch.

9. The system of claim 8, further comprising:
a system for tracing the MAC address associated with each IP address through the network to determine a switch and port to which the device corresponding to the IP address is connected.

10. The system of claim 9, further comprising:
a system for logging an identity of the switch and port to which the device corresponding to the IP address is connected.

11. The system of claim 8, wherein the list of IP addresses is input by a user, further comprising:
  sending results of the blocking to the user who input the list of IP addresses.

12. The system of claim 8, wherein the CAM filter isolates a device on a branch of the network from all devices on other branches of the network.

13. The system of claim 12, wherein all devices on the branch of the network containing the isolated device can communicate with each other.

14. The system of claim 12, wherein any non-isolated device on the branch of the network containing the isolated device can communicate with any other non-isolated device on the network.

15. A program product stored on a recordable medium, which when executed, automatically blocks a plurality of devices in a network, the computer readable medium comprising program code for causing a computer system to:
  detect a software infection or vulnerability in one of the plurality of devices in the network;
  determine a plurality of devices in the network that need to be blocked to prevent a spread of the software infection or vulnerability from the one device to other devices in the network;
  provide a list of Internet Protocol (IP) addresses corresponding to the plurality of devices to be blocked in the network; and
  automatically block the plurality of devices in response to the provision of the list of IP addresses, wherein, for each IP address in the list, the blocking is configured to:
    determine a router in the network connected to the IP address;
    determine a layer-2 Media Access Control (MAC) address associated with the IP address; and
    apply a CAM filter to a core switch associated with the router to block communication from the device corresponding to the IP address, at the core switch.

16. The program product of claim 15, further comprising:
for each IP address in the list:
  tracing the MAC address associated with the IP address through the network to determine a switch and port to which the device corresponding to the IP address is connected.

17. The program product of claim 16, further comprising:
  logging an identity of the switch and port to which the device corresponding to the IP address is connected.

18. The program product of claim 15, wherein the list of IP addresses is input by a user, further comprising:
  sending results of the blocking to the user who input the list of IP addresses.

19. The program product of claim 15, wherein the CAM filter isolates a device on a branch of the network from all devices on other branches of the network.

20. The program product of claim 19, wherein all devices on the branch of the network containing the isolated device can communicate with each other.

21. The program product of claim 19, wherein any non-isolated device on the branch of the network containing the isolated device can communicate with any other non-isolated device on the network.

22. A method for deploying an application for automatically blocking a plurality of devices in a network, comprising:
  providing a computer infrastructure being operable to:
    detect a software infection or vulnerability in one of the plurality of devices in the network;
    determine a plurality of devices in the network that need to be blocked to prevent a spread of the software infection or vulnerability from the one device to other devices in the network;
    provide a list of Internet Protocol (IP) addresses corresponding to the plurality of devices to be blocked in the network; and
    for each IP address in the list:
      determine a router in the network connected to the IP address;
      determine a layer-2 Media Access Control (MAC) address associated with the IP address; and
      apply a CAM filter to a core switch associated with the router to block communication from the device corresponding to the IP address, at the core switch;
    wherein the blocking of the plurality of devices occurs automatically in response to the provision of the list of IP addresses.

* * * * *